US007020769B2

(12) United States Patent
Goodrich

(10) Patent No.: US 7,020,769 B2
(45) Date of Patent: Mar. 28, 2006

(54) METHOD AND SYSTEM FOR PROCESSING A LOOP OF INSTRUCTIONS

(75) Inventor: Allen Bruce Goodrich, Tel Aviv (IL)

(73) Assignee: StarCore, LLC, Austin, TX (US)

( * ) Notice: Subject to any disclaimer, the term of this patent is extended or adjusted under 35 U.S.C. 154(b) by 325 days.

(21) Appl. No.: 10/675,092

(22) Filed: Sep. 30, 2003

(65) Prior Publication Data

US 2005/0071615 A1    Mar. 31, 2005

(51) Int. Cl.
*G06F 9/38* (2006.01)

(52) U.S. Cl. .................. 712/241; 712/207; 712/231
(58) Field of Classification Search ................ 712/207, 712/231, 241

See application file for complete search history.

(56) References Cited

U.S. PATENT DOCUMENTS

| 4,876,642 A | * | 10/1989 | Gibson ........................ 712/233 |
| 6,014,741 A | * | 1/2000 | Mahalingaiah ............... 712/233 |
| 6,505,295 B1 | * | 1/2003 | Hiraki et al. ................ 712/241 |
| 6,671,799 B1 | * | 12/2003 | Parthasarathy ............... 712/241 |

* cited by examiner

Primary Examiner—William M. Treat
(74) *Attorney, Agent, or Firm*—Michael A. Davis, Jr.; Davis Law Group, P.C.

(57) ABSTRACT

An information handling system processes a loop of instructions. In response to detecting processing of a particular instruction during a pass through the loop, the system initiates a fetch of an initial instruction that is programmed at a start of the loop, and stores an identification of a different instruction that is programmed between the initial instruction and the particular instruction. According to the stored identification, in response to detecting processing of the different instruction during an additional pass through the loop, the system initiates an additional fetch of the initial instruction.

20 Claims, 5 Drawing Sheets

US 7,020,769 B2

METHOD AND SYSTEM FOR PROCESSING A LOOP OF INSTRUCTIONS

BACKGROUND

The disclosures herein relate generally to information handling systems and in particular to a method and system for processing a loop of instructions.

In evolution of an information handling system, compatibility is desirable, so that a later version of the system may efficiently process a software program that is originally prepared for an earlier version of the system ("legacy software program"). For example, the system may process a loop of instructions. For a repeated pass through the loop, the system may encounter a need to repeatedly fetch instructions at the start of the loop. Such a need may result from (a) a practical constraint on size of the system's instruction fetch buffer and/or (b) a large number of instructions in the loop.

To reduce a likelihood of delay from such a repeated fetch, one technique uses a particular type of instruction for triggering the repeated fetch at a suitable moment during a pass through the loop. Nevertheless, within a software program, such instruction's placement is adapted for a particular version of the system. A different version of the system might process the software program less efficiently, unless such instruction's placement is revised for the different version. Unfortunately, such revision of the software program is potentially time-consuming, expensive and otherwise inefficient.

A need has arisen for a method and system for processing a loop of instructions, in which various shortcomings of previous techniques are overcome. For example, a need has arisen for a method and system for processing a loop of instructions, in which processing of a legacy software program is more efficient.

SUMMARY

One embodiment, accordingly, provides for an information handling system that processes a loop of instructions. In response to detecting processing of a particular instruction during a pass through the loop, the system initiates a fetch of an initial instruction that is programmed at a start of the loop, and stores an identification of a different instruction that is programmed between the initial instruction and the particular instruction. According to the stored identification, in response to detecting processing of the different instruction during an additional pass through the loop, the system initiates an additional fetch of the initial instruction.

A principal advantage of this embodiment is that various shortcomings of previous techniques are overcome, and processing of a legacy software program is more efficient.

DETAILED DESCRIPTION

Figure 1:
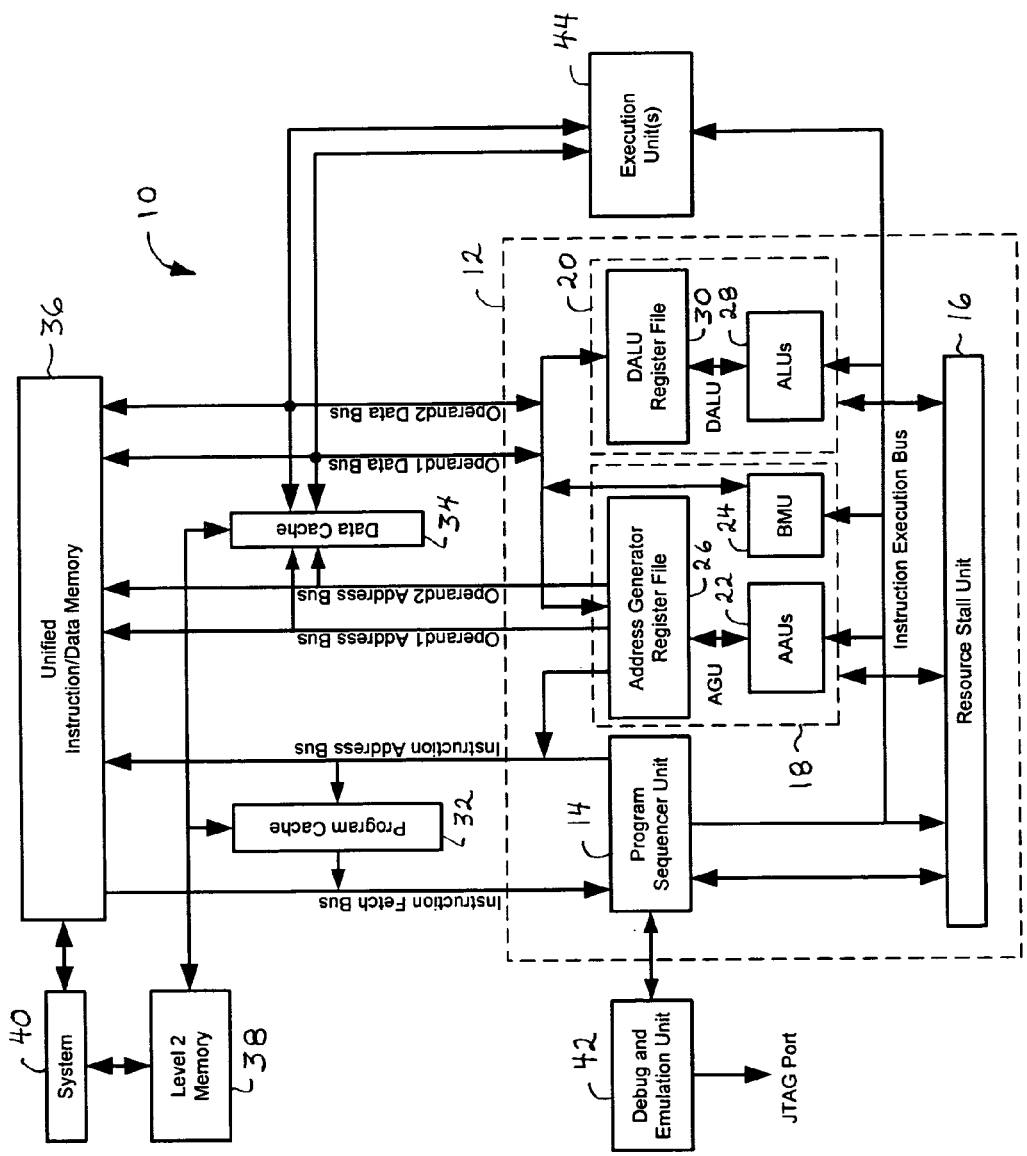
FIG. 1 is a block diagram of an example system according to the illustrative embodiment.

FIG. 1 is a block diagram of an example system, indicated generally at 10, for handling information (e.g., instructions, data, signals), according to the illustrative embodiment. In the illustrative embodiment, the system 10 is formed by various electronic circuitry components. Accordingly, the system 10 includes various units, registers, buffers, memories, and other components, which are (a) coupled to one another through buses, (b) formed by integrated circuitry in one or more semiconductor chips, and (c) encapsulated in one or more packages.

As shown in FIG. 1, the system 10 includes a core unit, indicated by a dashed enclosure 12, for performing various operations as discussed hereinbelow in connection with FIGS. 1–7. The core unit 12 includes: (a) a program sequencer unit 14; (b) a resource stall unit 16; (c) an address generation unit ("AGU"), indicated by a dashed enclosure 18; and (d) a data arithmetic logic unit ("DALU"), indicated by a dashed enclosure 20. The AGU includes arithmetic address units ("AAUs") 22, a bit mask unit ("BMU") 24, and an address generator register file 26. The DALU includes arithmetic logic units ("ALUs") 28 and a DALU register file 30. The program sequencer unit 14, resource stall unit 16, AGU 18 (including its various units and files), and DALU 20 (including its various units and files) are interconnected as shown in FIG. 1.

Further, as shown in FIG. 1, the core unit 12 is connected to a program cache 32, a data cache 34, and a unified instruction/data memory 36. The program cache 32 and data cache 34 are connected to a level-2 memory 38. The memories 36 and 38 are connected to other components 40 of the system 10.

Also, a debug & emulation unit 42 is coupled between the program sequencer unit 14 and a Joint Test Action Group ("JTAG") port for debugging and emulating various operations of the system 10, in accordance with conventional JTAG techniques. Moreover, as shown in FIG. 1, one or more additional execution unit(s) 44 is/are optionally connected to the core unit 12, data cache 34, and memory 36.

For performing its various operations, the system 10 includes various other interconnections, components (e.g., memory management circuitry) and other details that, for clarity, are not expressly shown in FIG. 1. For example, the various address buses communicate suitable control signals, in addition to address signals. Likewise, the various data buses communicate suitable control signals, in addition to data signals.

The resource stall unit 16 is responsible for controlling an interlocked pipeline of the system 10. In response to information from an instruction execution bus, the resource stall unit 16 stores information about the status (or state) of various components of the core unit 12. In response to such status (or state) information, the resource stall unit 16 resolves conflicts and hazards in the pipeline by outputting suitable information to the program sequencer unit 14, AGU 18, DALU 20, and various other components of the system 10.

For example, in response to information from the resource stall unit 16, the program sequencer unit 14 reads and dispatches instructions in order of their programmed sequence. For reading instructions, the program sequencer unit 14 outputs suitable instruction addresses to the program cache 32 and memory 36 via a 32-bit instruction address bus. Similarly, in response to information from the resource stall unit 16 and AAUs 22, the address generator register file 26 outputs suitable instruction addresses to the program cache 32 and memory 36 via the instruction address bus, as for example in response to various types of change of flow ("COF") instructions that loop, interrupt, or otherwise branch or jump away from the program sequencer unit 14 sequence of instruction addresses. Such addresses (received via the instruction address bus from either the program sequencer unit 14 or the address generator register file 26) indicate suitable memory locations that store a sequence of instructions for execution by the system 10 ("addressed instructions").

Accordingly, in response to such addresses: (a) if the addresses are then-currently indexed in the program cache 32, the program cache 32 outputs the addressed instructions to the program sequencer unit 14 via a 128-bit instruction fetch bus; or (b) otherwise, the memory 36 outputs the addressed instructions to the program sequencer unit 14 via the instruction fetch bus. The program sequencer unit 14 receives and stores such instructions. In response to such fetched instructions, and in response to information received from the resource stall unit 16, the program sequencer unit 14 outputs (or dispatches) such instructions at suitable moments via an instruction execution bus to the resource stall unit 16, AAUs 22, BMU 22, ALUs 28, and execution unit(s) 44. The program sequencer unit 14 also includes circuitry for performing operations in support of exception processing.

The system 10 includes multiple units for executing instructions, namely the AAUs 22, BMU 24, ALUs 28, and execution unit(s) 44. In response to status (or state) information from the resource stall unit 16, such units execute one or more instructions, according to the various types of instructions (e.g., according to an instruction's particular type of operation). For example, using integer arithmetic, the AAUs 22 execute the address calculation operations of various instructions, such as COF instructions. The BMU 24 executes various instructions for shifting and masking bits in operands. The ALUs 28 execute various instructions for performing arithmetic and logical operations (e.g., numeric addition, subtraction, multiplication, and division) on operands. The execution unit(s) 44 execute various instructions for performing application-specific operations on operands in an accelerated manner.

At suitable moments, the AAUs 22 communicate with the address generator register file 26 (and vice versa) by receiving their source operand information from (and outputting their resultant destination operand information for storage to) the address generator register file 26. Likewise, at suitable moments, the ALUs 28 communicate with the DALU register file 30 (and vice versa) by receiving their source operand information from (and outputting their resultant destination operand information for storage to) the DALU register file 30.

Similarly, at suitable moments, the BMU 24, address generator register file 26, DALU register file 30, and execution unit(s) 44 communicate with the data cache 34 and/or memory 36 (and vice versa) by receiving their source operand information from (and outputting their resultant destination operand information for storage to) the data cache 34 and/or memory 36 via 64-bit operand1 and operand2 data buses. The addresses of such operand information are output from the address generator register file 26 via respective 32-bit operand1 and operand2 address buses, in response to information from the AAUs 22.

The program cache 32 and data cache 34 receive and store copies of selected information from the level-2 memory 38. In comparison to the level-2 memory 38, the program cache 32 and data cache 34 are relatively small memories with higher speed. The information in program cache 32 and data cache 34 is modifiable. Accordingly, at suitable moments, the system 10 copies such modified information from the program cache 32 and data cache 34 back to an associated entry in the level-2 memory 38 for storage, so that coherency of such modified information is maintained.

Similarly, via the other components 40 of the system 10, the level-2 memory 38 receives and stores copies of selected information from the memory 36. In comparison to the memory 36, the level-2 memory 38 is a relatively small memory with higher speed. The information in the level-2 memory 38 is modifiable, as for example when the system 10 copies modified information from the program cache 32 and data cache 34 back to an associated portion of the level-2 memory 38. Accordingly, at suitable moments, the system 10 copies such modified information from the level-2 memory 38 back to an associated entry in the memory 36 for storage, so that coherency of such modified information is maintained.

The system 10 achieves high performance by processing multiple instructions simultaneously at various ones of the AAUs 22, BMU 24, ALUs 28, and execution unit(s) 44. For example, the system 10 processes each instruction by a sequence of interlocked pipeline stages. Accordingly, the system 10 processes each stage of a particular instruction in parallel with various stages of other instructions.

In general, the system 10 operates with one machine cycle ("cycle") per stage (e.g., any stage's duration is a single machine cycle). However, some instructions (e.g., ACS, MAC, MPY and SAD, as described in Table 1) may require multiple machine cycles for execution (i.e., such instructions are executable in only multiple machine cycles of the system 10). Also, a memory access (e.g., instruction fetch or operand load) may require several machine cycles of the system 10. In response to conflicts (e.g., read/write conflicts) between instructions, the resource stall unit 16 selectively introduces one or more delays (or stalls) in finishing a particular instruction's execution stage.

TABLE 1

Instructions Having Two Machine Cycles for Execution

| Instruction & Example Assembly Syntax | Example Operation (performed by the DALU 20) |
|---|---|
| Add compare select ("ACS") | Performs four (4) operations of addition/subtraction between a selection of high portion ("HP") and low portion ("LP") |

TABLE 1-continued

Instructions Having Two Machine Cycles for Execution

| Instruction & Example Assembly Syntax | Example Operation (performed by the DALU 20) |
|---|---|
| ACS2 Da.X, Db.Y, Dc, Dn | contents of operand registers (Da, Db, Dc, Dn). Compares and finds the maximum of the results of the first two operations, and writes the maximum result to the HP of an operand register (Dn.H). Compares and finds the maximum of the results of the last two operations, and writes the maximum result to the LP of the operand register (Dn.L). If the first operation result is greater than the second operation result, bit 32 in the destination operand register (Dn[32]) is cleared; otherwise, the bit is set. If the third operation result is greater than the fourth operation result, bit 33 in the destination operand register (Dn[33]) is cleared; otherwise, the bit is set. The two HP and LP of the destination are limited to 16-bits. In case of overflow, the results are saturated to 16-bits maximum or minimum values. The extension byte of the result is undefined. |
| Multiply-accumulate signed fractions ("MAC") MAC Da, Db, Dn | Performs signed fractional multiplication of two 16-bit signed operands (Da.H/L and Db.H/L). Then adds or subtracts the product to or from a destination operand register (Dn). One operand is the HP or the LP of an operand register. The other operand is the HP or the LP of an operand register or an immediate 16-bit signed data. |
| Multiply signed fractions ("MPY") MPY Da, Db, Dn | Performs signed fractional multiplication of the high or low portions of two operand registers (Da, Db) and stores the product in a destination operand register (Dn). |
| Sum of absolute byte difference ("SAD") SAD4 Da, Db, Dn | Performs a 32-bit subtraction of source register Da from Db with the borrow disabled between bits 7 and 8, 15 and 16, and 23 and 24, so that the four bytes of each register are unsigned subtracted separately. The absolute value of each subtraction is added to the LP of the destination register Dn. The extension byte and the HP of the result are zero extended. |

In the illustrative embodiment, the system 10 processes an instruction in a sequence of ten interlocked pipeline stages, as described in Table 2, so that each instruction is processed in the same sequence of stages. During each pipeline stage, the system 10 prepares the instruction for its next stage. After the system 10 initiates an instruction's processing, the system 10 initiates the immediately subsequent instruction's processing at a later time (e.g., one machine cycle later). In that manner, the system 10 concurrently processes various stages of multiple instructions.

The multi-stage pipeline of the system 10 includes multiple execution stages. For example, in the illustrative embodiment as described in Table 2, the pipeline includes a first execution stage (E-stage) and a second execution stage (M-stage). In an alternative embodiment, the pipeline includes first and second execution stages, plus at least one additional execution stage. In such an alternative embodiment, the respective operations of the multiple execution stages are suitably established, according to the various objectives of the system 10, so that one or more of the E-stage or M-stage operations (which are described in Table 2 and elsewhere hereinbelow in connection with FIGS. 2–7) is/are performed instead (or additionally) by a suitable one or more of the multiple execution stages.

For example, in a first alternative embodiment, the additional execution stage(s) precede(s) the illustrative embodiment's first execution stage, so that the additional execution stage(s) would be immediately preceded by the C-stage in Table 2 and would perform operations accordingly. In a second alternative embodiment, the additional execution stage(s) follow(s) the illustrative embodiment's second execution stage, so that the additional execution stage(s) would be immediately followed by the W-stage in Table 2 and would perform operations accordingly. In a third alternative embodiment, one or more of the additional execution stage(s) precede(s) the illustrative embodiment's first execution stage, and one or more of the additional execution stage(s) follow(s) the illustrative embodiment's second execution stage, so that: (a) at least one of the additional execution stage(s) would be immediately preceded by the C-stage in Table 2 and would perform operations accordingly; and (b) at least one of the additional execution stage(s) would be immediately followed by the W-stage in Table 2 and would perform operations accordingly. Thus, similar to the illustrative embodiment, such alternative embodiments likewise benefit from the techniques discussed hereinbelow (in connection with FIGS. 2–7), and such techniques are likewise applicable to such alternative embodiments.

TABLE 2

Pipeline Stages Overview

| Pipeline Stage | Symbol | Description |
|---|---|---|
| Program Address | P-stage | During this machine cycle, via the instruction address bus, a suitable instruction address is output to the program cache 32 and memory 36. |

TABLE 2-continued

Pipeline Stages Overview

| Pipeline Stage | Symbol | Description |
| --- | --- | --- |
| Read Memory | R-stage | During this machine cycle, in response to the instruction address that was output during the P-stage, instructions are accessed in the program cache 32 and/or memory 36, and sixteen (16) sequential bytes of instructions are output via the instruction fetch bus from the program cache 32 and/or memory 36, according to whether the instruction address is then-currently indexed in the program cache 32. |
| Fetch | F-stage | During this machine cycle, via the instruction fetch bus, the program sequencer unit 14 receives and stores the sixteen (16) sequential bytes of instructions that were output during the R-stage. |
| VLES Dispatch | V-stage | During this machine cycle, the program sequencer unit 14 dispatches a variable length execution set ("VLES") instruction via the instruction execution bus to suitable execution units (i.e., the AAUs 22, BMU 24, ALUs 28, and execution unit(s) 44). If the instruction is a prefix instruction, which modifies the manner in which the system 10 processes subsequent instructions (e.g., if subsequent instructions are part of an alternative instruction set, which may be executed by execution unit(s) 44 to perform application-specific operations), the prefix instruction is decoded accordingly by the program sequencer unit 14 during this machine cycle. |
| Decode | D-stage | During this machine cycle, the dispatched instruction is decoded by the instruction's execution unit (i.e., the execution unit that will execute the instruction). |
| Address generation | A-stage | During this machine cycle, via the operand1 and operand2 address buses, the AGU 18 (from its address generator register file 26) outputs addresses of source operand information and destination operand information to the data cache 34 and memory 36. |
| Memory aCcess | C-stage | During this machine cycle, in response to the addresses that were output during the A-stage, source operand information is accessed in the data cache 34 and/or memory 36, and the source operand information is output via the operand1 and operand2 data buses from the data cache 34 and/or memory 36, according to whether the source operand information's address is then-currently indexed in the data cache 34. |
| Execution | E-stage | During this machine cycle, via the operand1 and operand2 data buses, the instruction's execution unit receives source operand information that was output during the C-stage. Also, during this machine cycle, the instruction's execution unit executes the instruction. |
| Mac | M-stage | During this machine cycle, if the instruction requires two machine cycles for execution, the instruction's execution unit finishes executing the instruction. Conversely, if the instruction requires only a single machine cycle for execution and is executed during the E-stage, the system 10 prepares the instruction for its W-stage, but otherwise performs no operation ("NOP") in response to the instruction during this machine cycle. |
| Write back | W-stage | During this machine cycle, via the operand1 and operand2 data buses, the instruction's execution unit outputs (or writes or stores) destination operand information to the data cache 34 and/or memory 36, according to whether the destination operand information's address is then-currently indexed in the data cache 34. |

Figure 2:
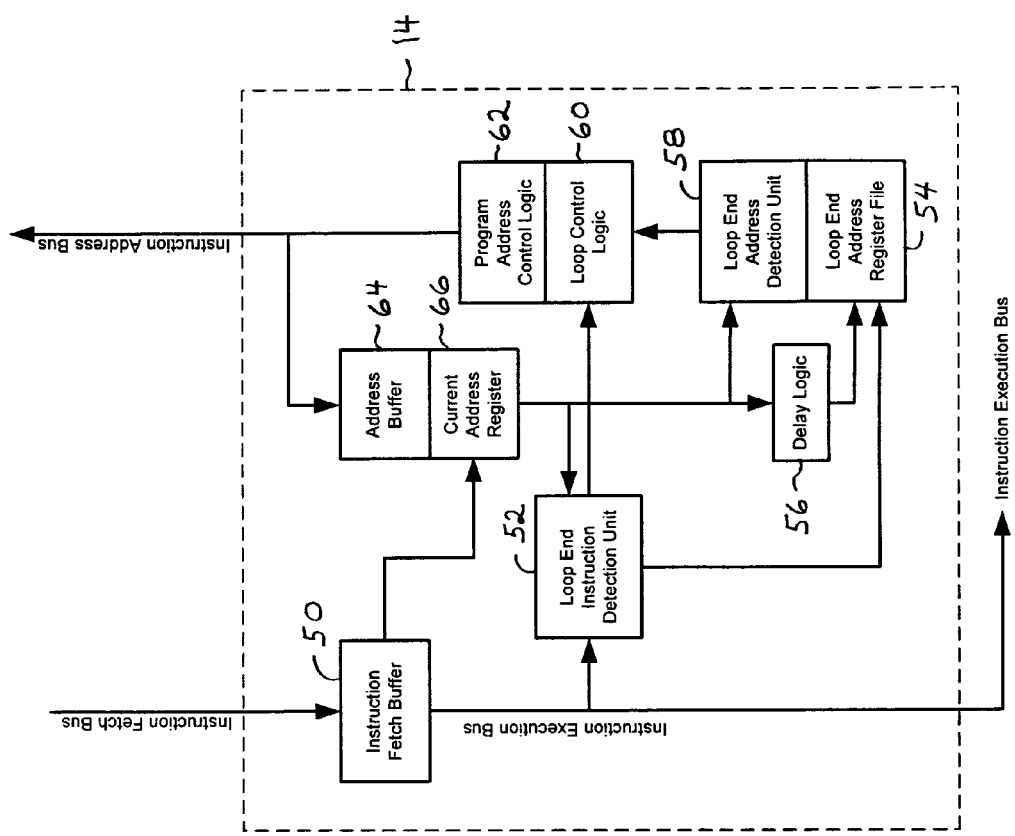
FIG. 2 is a block diagram of a program sequencer unit of the system of FIG. 1.

FIG. 2 is a block diagram of the program sequencer unit 14. As shown in FIG. 2, the program sequencer unit 14 includes an instruction fetch buffer 50, a loop end instruction detection unit 52, a loop end address register file 54, a delay logic 56, a loop end address detection unit 58, a loop control logic 60, a program address control logic 62, an address buffer 64, and a current address register 66. Such elements of the program sequencer unit 14 perform various operations as discussed hereinbelow in connection with FIGS. 2–7.

For performing its various operations, the program sequencer unit 14 includes various other interconnections (e.g., to the resource stall unit 16), components and other details that, for clarity, are not expressly shown in FIG. 2. For example, the program address control logic 62 is connected to the instruction address bus of FIG. 1 and performs the P-stage operations of the program sequencer unit 14. During a P-stage of an instruction, if the program address control logic 62 or AGU 18 outputs an instruction address in response to a COF instruction, the address buffer 64 receives and buffers (or stores) such instruction address, at least until such instruction address is received (as discussed hereinbelow) from the address buffer 64 by the current address register 66.

The instruction fetch buffer 50 is coupled between the instruction fetch bus of FIG. 1 and the instruction execution bus of FIG. 1. In response to the program address control logic 62 performing a P-stage operation: (a) during the immediately following machine cycle(s), a corresponding R-stage operation is performed; and (b) during the immediately following machine cycle(s) after the R-stage operation is performed, the instruction fetch buffer 50 performs a corresponding F-stage operation of the program sequencer unit 14. The instruction fetch buffer 50 receives and buffers up to sixty-four (64) bytes of instructions from the instruction fetch bus.

In the absence of contrary information from the AGU 18 (in the event of a COF instruction): (a) as the instruction fetch buffer 50 performs V-stages of one or more instructions, the current address register 66 increments its latched address by the number of dispatched instruction bytes (i.e., which may be an even number ranging from 2 to 16 bytes, because the instructions are VLES instructions), which the current address register 66 receives from the instruction fetch buffer 50; and (b) in so performing an instruction's V-stage, if the instruction is processed in response to a COF instruction, the current address register 66 receives and latches a next instruction address from the address buffer 64. After so receiving and latching the next instruction address from the address buffer 64, the current address register 66 increments if necessary to ensure that its latched address is associated with the instruction whose V-stage is being performed by the instruction fetch buffer 50.

The instruction fetch buffer 50 operates as a first-in first-out queue. In the illustrative embodiment, the system 10 coordinates F-stages and V-stages of instructions in a manner that generally avoids completely filling the instruction fetch buffer 50. Nevertheless, even if the instruction fetch buffer 50 is full, it ceases being full if it performs V-stages of at least sixteen (16) bytes of instructions. This is because, during such V-stages, the instruction fetch buffer 50 outputs such buffered instructions to the instruction execution bus.

In the absence of contrary information from the loop control logic 60 (or the AGU 18 in the event of a COF instruction), the program address control logic 62 performs the P-stage operation by outputting an instruction address that is incremented from its most recently output instruction address. Such increment is sixteen (16) (i.e., the number of bytes received by the instruction fetch buffer 50 from the instruction fetch bus during an F-stage).

The current address register 66 outputs its latched instruction address to the loop end instruction detection unit 52, delay logic 56, and loop end address detection unit 58. The delay logic 56: (a) receives the then-current instruction address from the current address register 66; (b) in response thereto, stores (or latches) such address; and (c) outputs it on a delayed basis to the loop end address register file 54. Such delay is a preselected integer amount q machine cycles. Additional operations of the loop end instruction detection unit 52, loop end address register file 54, delay logic 56, loop end address detection unit 58, and loop control logic 60 are discussed hereinbelow in connection with FIGS. 3–7.

Figure 3:
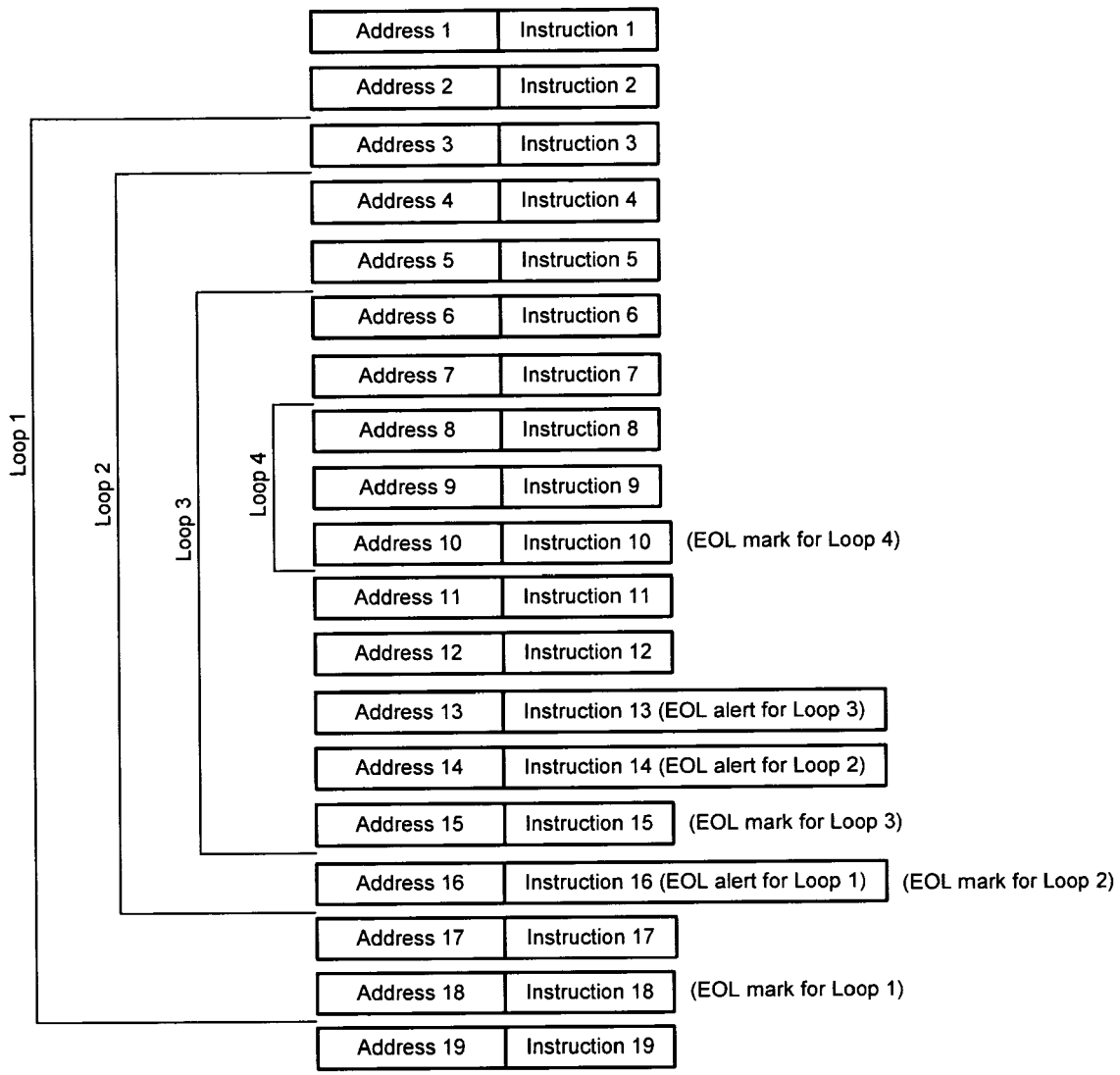
FIG. 3 is a conceptual illustration of an example of nested loops of instructions processed by the system of FIG. 1.

FIG. 3 is a conceptual illustration of an example of nested loops of instructions processed by the system of FIG. 1. FIG. 3 illustrates a sequence of nineteen (19) instructions (i.e., Instruction 1 through Instruction 19), which are stored at nineteen (19) respectively associated addresses (i.e., Address 1 through Address 19). In the example of FIG. 3, the sequence includes four (4) nested loops of instructions, namely:

(a) a Loop 1, which is formed by the Instructions 3–18;
(b) a Loop 2, which is formed by the Instructions 4–16;
(c) a Loop 3, which is formed by the Instructions 6–15; and
(d) a Loop 4, which is formed by the Instructions 8–10.

As shown in FIG. 3, the Loop 4 is nested within the Loop 3, so that the Loop 3 includes all of Loop 4's instructions. Similarly, the Loop 3 is nested within the Loop 2, so that the Loop 2 includes all of Loop 3's instructions. Also, the Loop 2 is nested within the Loop 1, so that the Loop 1 includes all of Loop 2's instructions.

On a then-current basis, the system 10 processes an instruction within up to a fixed number (e.g., four (4)) of such nested loops. For that purpose, the program sequencer unit 14 includes and operates registers for storing: (a) up to the fixed number of loop start addresses; and (b) up to the fixed number of loop counts. Accordingly, the loop start address registers are respectively associated with the nested loops. Likewise, the loop count registers are respectively associated with the nested loops.

Accordingly, if an instruction's address is stored in the loop's associated start address register, such instruction is the loop's first (or initial) instruction during a pass through the loop. In the example of FIG. 3, the loop start address registers store, respectively: (a) the loop start address of Loop 1, which is Address 3; (b) the loop start address of Loop 2, which is Address 4; (c) the loop start address of Loop 3, which is Address 6; and (d) the loop start address of Loop 4, which is Address 8. Similarly, the loop count registers store, respectively: (a) the number of times that Loop 1 has been fully processed; (b) the number of times that Loop 2 has been fully processed; (c) the number of times that Loop 3 has been processed; and (d) the number of times that Loop 4 has been fully processed.

If a first loop (e.g., a relatively "inner" loop, such as Loop 3) is nested within a second loop (e.g., a relatively "outer" loop, such as Loop 2 or Loop 1), and if the first loop is terminated by the system 10, the first loop may nevertheless be repeatedly processed again by the system 10 in the course of repeating the second loop. In the absence of an exception or COF instruction, until the loop is terminated, the loop is repeatedly processed in multiple passes by the system 10 before processing an instruction outside the loop. Within the loop, an instruction may specify the loop's termination to occur after the loop has been fully processed a specified number of passes (since the loop's most recent termination, if any). Accordingly, the loop's associated loop count register is useful for governing the loop's termination, and the system 10 resets such count register in response to such termination.

As shown in FIG. 3, each loop has an associated end of loop ("EOL") mark, which marks the end of the loop in an explicit or implicit manner. For example, (a) the associated EOL mark for Loop 1 is located at the Instruction 18, (b) the associated EOL mark for Loop 2 is located at the Instruction 16, (c) the associated EOL mark for Loop 3 is located at the Instruction 15, and (d) the associated EOL mark for Loop 4 is located at the Instruction 10. Accordingly, if the loop's associated EOL mark is located at an instruction, such instruction is the loop's final instruction during a pass through the loop.

Referring also to FIG. 2, the program sequencer unit 14 performs the P-stage operation in the initial processing of a loop's instructions. But subsequently, even while the loop is repeatedly processed in multiple passes by the system 10, and in the absence of an exception or COF instruction, if the total size of a loop's instructions is less than or equal to sixty-four (64) bytes (i.e., the size of the instruction fetch buffer 50): (a) the program sequencer unit 14 continues buffering all of the loop's instructions in the instruction fetch buffer 50 until the loop is terminated; and (b) during such period, the program sequencer unit 14 does not repeat (or reperform) the P-stage operation for the loop's instructions. In FIG. 3, the Loop 4 is an example of such a loop.

Conversely, if the total size of a loop's instructions is greater than sixty-four (64) bytes, and if the loop is repeatedly processed in multiple passes by the system 10, the program sequencer unit 14 repeats the P-stage operation for one or more of the loop's instructions. In FIG. 3, the Loops 1, 2 and 3 are examples of such a loop. Such reperformance of the P-stage operation (and its corresponding R-stage and F-stage operations) might delay (or stall) operation of the system 10, because a memory access (e.g., instruction fetch) may require more machine cycles than anticipated by a then-currently processed instruction sequence (e.g., legacy instruction sequence).

It is preferable for the system 10 to reduce such delay. Accordingly, if the loop is then-currently active, then as the system 10 processes an instruction near the loop's associated EOL mark, the program sequencer unit 14 initiates reperformance of the P-stage operation for instructions at the loop's start address (which also results in reperformance of corresponding R-stage and F-stage operations during the immediately following machine cycles, as discussed hereinabove in connection with the instruction fetch buffer 50 and program address control logic 62).

The then-current active loop is the innermost nested loop that both: (a) contains the then-current instruction address, which is output from the current address register 66; and (b) is then-currently scheduled to be repeated in another pass before processing an instruction outside such loop (e.g., in the absence of an exception or COF instruction, and if the loop's associated loop count register indicates that the loop has not yet been processed its specified number of times, as discussed hereinabove in connection with FIG. 3).

Such initiation occurs suitably in advance of the system 10 repeating other stages of such instructions at the loop's start address. Such advance initiation helps to reduce delay that might otherwise result from reperformance of such P-stage operation.

In FIG. 3, such advance initiation is triggered by EOL alerts in selected instructions. The Loop 4 does not have an EOL alert, because the program sequencer unit 14 does not repeat the P-stage operation for Loop 4's instructions before the Loop 4 is terminated, as discussed hereinabove in connection with FIG. 3. By comparison, (a) the Loop 3 has an associated EOL alert in the Instruction 13, (b) the Loop 2 has an associated EOL alert in the Instruction 14, and (c) the Loop 1 has an associated EOL alert in the Instruction 16.

Accordingly, in the example of FIG. 3, a loop's associated EOL alert is located in the loop's third-to-last instruction. Nevertheless, as discussed hereinbelow in connection with FIGS. 4–7, the program sequencer unit 14 is equipped to even sooner initiate reperformance of the P-stage operation for instructions at the loop's start address, so that: (a) the P-stage operation and its corresponding R-stage and F-stage operations are more likely finished before the instruction fetch buffer 50 is ready to perform the respective V-stage operations for such instructions; and (b) accordingly, stalls are less likely.

In one example, the program sequencer unit 14 is equipped to initiate such reperformance q instructions in advance of the loop's associated EOL alert, where q is a preselected integer amount (e.g., 1). Such a feature is advantageous in situations where: (a) legacy instruction sequences include an associated EOL alert in the loop's $n^{th}$-to-last instruction, but where performance of the system 10 is further enhanced by triggering such advance initiation in response to the loop's $k^{th}$-to-last instruction, where k and n are integers, and where k is greater than n by the preselected integer amount q; and (b) recompiling or reprogramming the legacy instruction sequences is expensive, untimely, inefficient or impractical.

Figure 4:
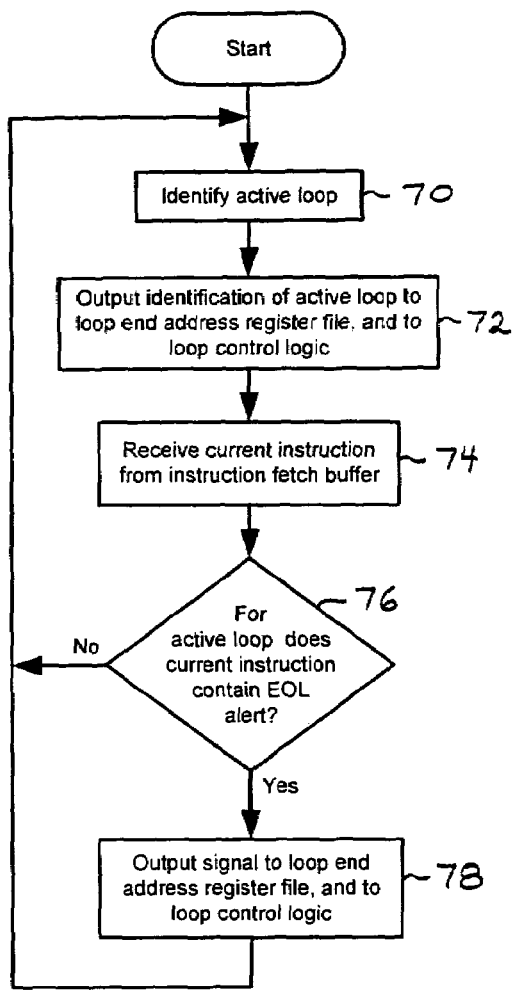
FIG. 4 is a flowchart of an operation of a loop end instruction detection unit of the program sequencer unit of FIG. 2.

FIG. 4 is a flowchart of an operation of the loop end instruction detection unit 52. The operation starts at a step 70. At the step 70, the loop end instruction detection unit 52 identifies (or determines) the then-current active loop. After the step 70, the operation continues to a step 72.

At the step 72, the loop end instruction detection unit 52 outputs the identification of the then-current active loop to the loop end address register file 54 and loop control logic 60. After the step 72, the operation continues to a step 74. At the step 74, from the instruction fetch buffer 50 via the instruction execution bus, the loop end instruction detection unit 52 receives the instruction whose V-stage is then-currently being performed by the instruction fetch buffer 50. After the step 74, the operation continues to a step 76.

At the step 76, the loop end instruction detection unit 52 determines whether such instruction (received from the instruction fetch buffer 50 via the instruction execution bus) includes an EOL alert that is associated with the then-current active loop. If not, the operation returns to the step 70. Conversely, if such instruction includes an EOL alert that is associated with the then-current active loop, the operation continues to a step 78. At the step 78, the loop end instruction detection unit 52 outputs a signal to the loop end address register file 54 and loop control logic 60. After the step 78, the operation returns to the step 70.

Figure 5:
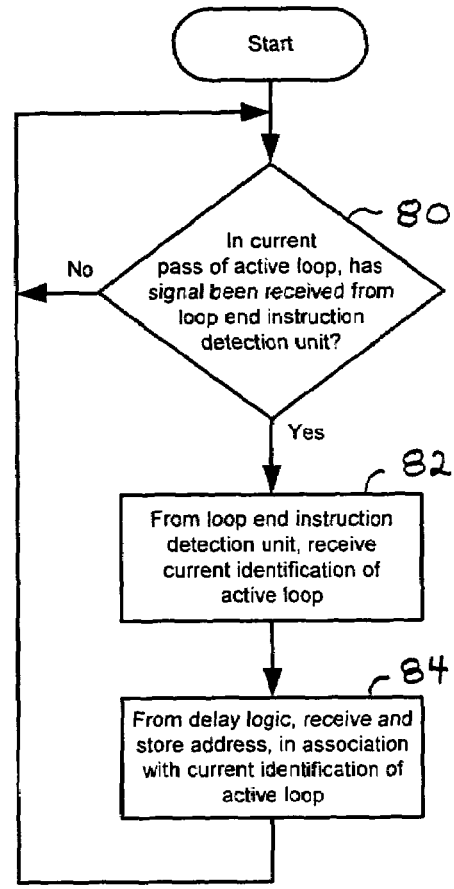
FIG. 5 is a flowchart of an operation of a loop end address register file of the program sequencer unit of FIG. 2.

FIG. 5 is a flowchart of an operation of the loop end address register file 54. The operation starts at a step 80. At the step 80, the loop end address register file 54 determines whether (during the then-current pass through the then-current active loop) it has received the signal from the loop end instruction detection unit 52. If not, the operation self-loops at the step 80. Conversely, if (during the then-current pass through the then-current active loop) the loop end address register file 54 receives the signal from the loop end instruction detection unit 52, the operation continues to a step 82.

At the step 82, from the loop end instruction detection unit 52, the loop end address register file 54 receives the identification of the then-current active loop. After the step 82, the operation continues to a step 84. At the step 84, the loop end address register file 54: (a) stores the identification of the then-current active loop ("stored loop identification"); (b) receives the address output from the delay logic 56; and (c) stores such address in association with the stored loop identification. For example, at the step 84, if the then-current active loop's associated EOL alert is located in the loop's $n^{th}$-to-last instruction, then the delay logic 56 outputs the loop's $k^{th}$-to-last address to the loop end address register file 54, where k and n are integers, and where k is greater than n by the preselected integer amount q. After the step 84, the operation returns to the step 80.

In this manner, the loop end address register file 54 stores up to a predetermined number (e.g., 4) of addresses, each in association with a respective stored loop identification. If the loop end address register file 54 already stores the predetermined number of addresses before it performs the step 84, the loop end address register file 54 overwrites one of them on a least recently used ("LRU") basis when the loop end address register file 54 performs the step 84. The stored address and its associated stored loop identification (written in the loop end address register file 54 at the step 84) are written in the loop end address register file 54 during each pass through the loop. Accordingly, even if the stored address and its associated stored loop identification are overwritten (e.g., during processing by the system 10 of an interrupt instruction sequence), such address and its associated loop identification are restored in the loop end address register file 54 during a next pass through the loop.

In one example, if a first loop is terminated by the system 10 after a first set of passes, yet the first loop is nevertheless repeatedly processed again in a second set of passes by the system 10 (e.g., in the course of repeating a second relatively "outer" loop), the stored address and its associated stored loop identification (written in the loop end address register file 54 at the step 84 during the first set of passes) remain stored in the loop end address register file 54 after such termination and through the start and completion of the second set of passes.

Figure 6:
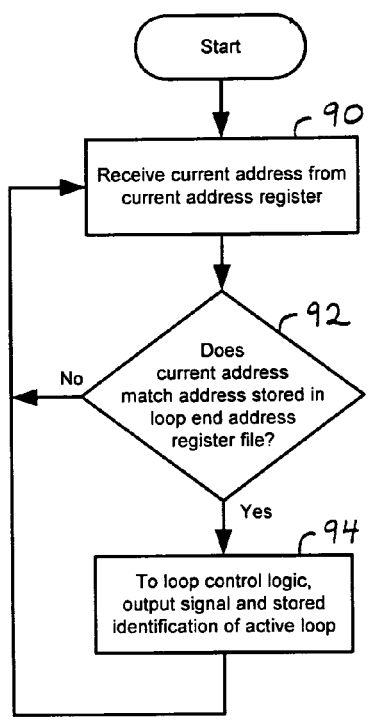
FIG. 6 is a flowchart of an operation of a loop end address detection unit of the program sequencer unit of FIG. 2.

FIG. 6 is a flowchart of an operation of the loop end address detection unit 58. The operation starts at a step 90, at which the loop end address detection unit 58 receives the then-current instruction address from the current address register 66. After the step 90, the operation continues to a step 92.

At the step 92, the loop end address detection unit 58 determines whether the then-current instruction address matches an address that is stored in the loop end address register file 54. If not, the operation returns to the step 90. Conversely, if the then-current instruction address matches an address that is stored in the loop end address register file 54, the operation continues to a step 94.

At the step 94, the loop end address detection unit 58: (a) from the loop end address register file 54, reads the stored loop identification that is associated with such address; and (b) to the loop control logic 60, outputs the stored loop identification and a signal. At the time when the loop end address detection unit 58 performs the step 94, the stored loop identification does not necessarily identify the then-current active loop, because the then-current active loop may have changed since the stored loop identification was written in the loop end address register file 54. After the step 94, the operation returns to the step 90.

Figure 7:
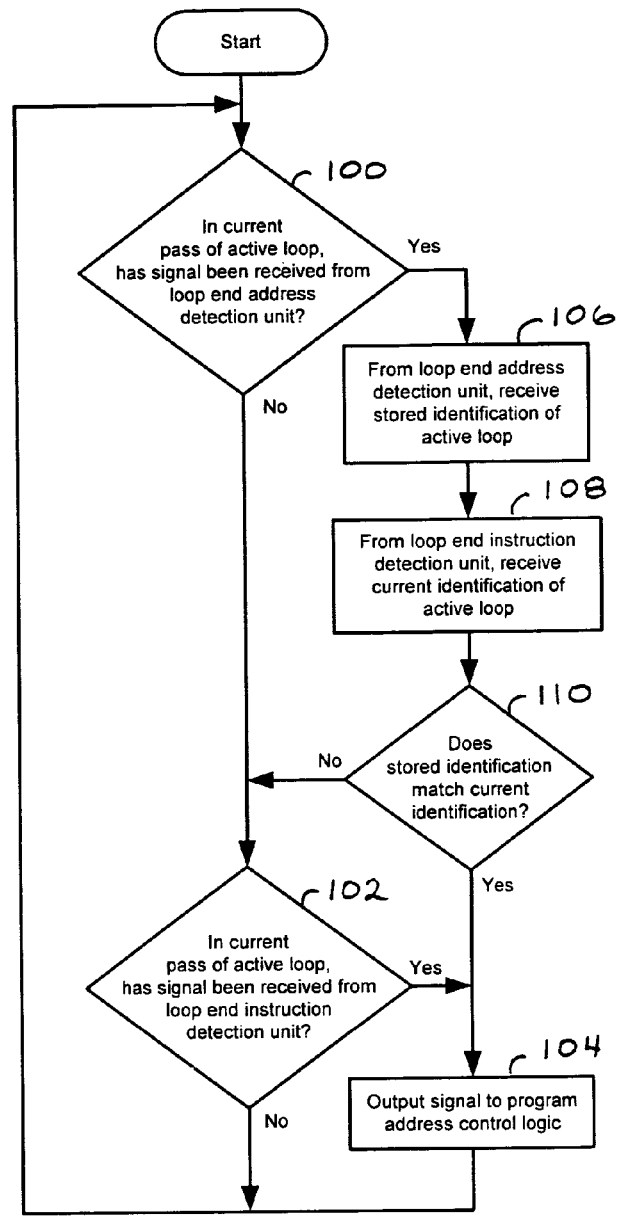
FIG. 7 is a flowchart of an operation of a loop control logic of the program sequencer unit of FIG. 2.

FIG. 7 is a flowchart of an operation of the loop control logic 60. The operation starts at a step 100, at which the loop control logic 60 determines whether (during the then-current pass through the then-current active loop) it has received the signal from the loop end address detection unit 58. If not, the operation continues to a step 102.

At the step 102, the loop control logic 60 determines whether (during the then-current pass through the then-current active loop) it has received the signal from the loop end instruction detection unit 52. If not, the operation returns to the step 100. Conversely, if (during the then-current pass through the then-current active loop) the loop control logic 60 receives the signal from the loop end instruction detection unit 52, the operation continues to a step 104.

At the step 104, the loop control logic 60 outputs a signal (identifying the then-current active loop) to the program address control logic 62. In response to such signal, the program address control logic 62 reads the then-current active loop's start address (from the then-current active loop's associated start address register) and initiates reperformance of the P-stage operation for instructions at the then-current active loop's start address. After the step 104, the operation returns to the step 100.

At the step 100, if (during the then-current pass through the then-current active loop) the loop control logic 60 receives the signal from the loop end address detection unit 58 (indicating that the then-current instruction address matches an address that is stored in the loop end address register file 54), the operation continues to a step 106. At the step 106, the loop control logic 60 receives the stored loop identification that was output by the loop end address detection unit 58 (step 94 of FIG. 6). At the time when the loop control logic 60 performs the step 106, the stored loop identification does not necessarily identify the then-current active loop, because the then-current active loop may have changed since the stored loop identification was written in the loop end address register file 54.

After the step 106, the operation continues to a step 108. At the step 108, from the loop end instruction detection unit 52, the loop control logic 60 receives the identification of the then-current active loop. After the step 108, the operation continues to a step 110.

At the step 110, the loop control logic 60 determines whether the stored loop identification (received at the step 106) matches the identification of the then-current active loop (received at the step 108). If not, the operation continues to the step 102. Conversely, if the stored loop identification matches the identification of the then-current active loop, the signal that the loop control logic 60 received from the loop end address detection unit 58 (step 100) is then-currently valid, and the operation continues to the step 104.

In an alternative embodiment, at step 76 (FIG. 4), the loop end instruction detection unit 52 also determines whether the then-current active loop's associated EOL mark is located at the instruction (received from the instruction fetch buffer 50 via the instruction execution bus). If so, the operation continues to the step 78. In a modified version of such alternative embodiment, such operation continues to the step 78 if the then-current active loop's associated EOL mark is located at such instruction, but only if the loop end instruction detection unit 52 has not previously encountered an EOL alert (associated with the then-current active loop) during the then-current pass. In another modified version of such alternative embodiment, even if such operation continues to the step 78 in response to the then-current active loop's associated EOL mark being located at such instruction, the delay logic 56 (at the step 84 of FIG. 5) outputs the loop's $k^{th}$-to-last address (as discussed hereinabove), so that the loop end address register file 54 receives such address and stores it association with the stored loop identification. Accordingly, such alternative embodiment versions achieve various advantages discussed hereinabove, even if the instruction sequence includes no EOL alerts.

In summary, as described hereinabove, the system 10 processes one or more loops of instructions. In response to the loop end instruction detection unit 52 detecting processing of a particular instruction (e.g., an instruction that includes the then-current active loop's associated EOL alert, and/or an instruction at which the then-current active loop's associated EOL mark is located) during a pass through the then-current active loop, the program sequencer unit 14: (a) initiates a fetch of an initial instruction that is programmed at a start of the then-current active loop (i.e., the instruction that is stored at the then-current active loop's associated start address); and (b) stores an identification (e.g., address) of a different instruction (e.g., the then-current active loop's $k^{th}$-to-last instruction) that is programmed between the initial instruction and the particular instruction (i.e., the instruction that is stored at the then-current active loop's $k^{th}$-to-last address). According to the stored identification, in response to the loop end address detection unit 58 detecting processing of the different instruction during an additional pass through the then-current active loop, the program sequencer unit 14 initiates an additional fetch of the initial instruction before processing the then-current active loop's final instruction during the additional pass.

Although illustrative embodiments have been shown and described, a wide range of modification, change and substitution is contemplated in the foregoing disclosure and, in some instances, some features of the embodiments may be employed without a corresponding use of other features. Accordingly, it is appropriate that the appended claims be construed broadly and in a manner consistent with the scope of the embodiments disclosed herein.

What is claimed is:

1. A method performed by an information handling system in processing a loop of instructions, comprising:
   in response to detecting processing of a particular instruction during a pass through the loop, initiating a fetch of an initial instruction that is programmed at a start of the loop, and storing an identification of a different instruction that is programmed between the initial instruction and the particular instruction; and
   according to the stored identification, in response to detecting processing of the different instruction during an additional pass through the loop, initiating an additional fetch of the initial instruction.

2. The method of claim 1, wherein initiating the fetch comprises:
   in response to detecting processing of the particular instruction during the pass through the loop, initiating the fetch before processing a final instruction during the additional pass, wherein the final instruction is programmed at an end of the loop.

3. The method of claim 1, wherein initiating the additional fetch comprises:
   in response to detecting processing of the different instruction during the additional pass through the loop, initiating the additional fetch before processing a final instruction during the additional pass, wherein the final instruction is programmed at an end of the loop.

4. The method of claim 1, wherein the particular instruction is an instruction that includes an end-of-loop alert associated with the loop.

5. The method of claim 1, wherein the particular instruction is an instruction at which an end-of-loop mark is located in association with the loop.

6. The method of claim 1, wherein the loop is a first loop, and wherein the information handling system processes multiple loops of instructions including the first loop and a second loop, and wherein initiating the fetch comprises:
   in response to detecting processing of the particular instruction during the pass through the loop, initiating the fetch if the first loop is an innermost nested loop that contains the particular instruction and is scheduled to be repeated in the additional pass before processing an instruction outside the first loop.

7. The method of claim 6, wherein initiating the additional fetch comprises:
   in response to detecting processing of the different instruction during the additional pass through the loop, initiating the additional fetch if the first loop is an innermost nested loop that contains the different instruction and is scheduled to be repeated in yet another pass before processing an instruction outside the first loop.

8. The method of claim 7, wherein the particular instruction is a first particular instruction, the initial instruction is a first initial instruction, the different instruction is a first different instruction, and the stored identification is a first stored identification, and comprising:
   in response to detecting processing of a second particular instruction during a pass through the second loop, initiating a fetch of a second initial instruction that is programmed at a start of the second loop, and storing a second identification of a second different instruction that is programmed between the second initial instruction and the second particular instruction; and
   according to the second stored identification, in response to detecting processing of the second different instruction during an additional pass through the second loop, initiating an additional fetch of the second initial instruction.

9. The method of claim 8, wherein initiating the fetch of the second initial instruction comprises:
   in response to detecting processing of the second particular instruction during the pass through the second loop, initiating the fetch if the second loop is an innermost nested loop that contains the second particular instruction and is scheduled to be repeated in the additional pass before processing an instruction outside the second loop.

10. The method of claim 9, wherein initiating the additional fetch of the second initial instruction comprises:
    in response to detecting processing of the second different instruction during the additional pass through the second loop, initiating the additional fetch if the second loop is an innermost nested loop that contains the second different instruction and is scheduled to be repeated in yet another pass before processing an instruction outside the second loop.

11. A system for processing a loop of instructions, comprising:
    circuitry for:
    in response to detecting processing of a particular instruction during a pass through the loop, initiating a fetch of an initial instruction that is programmed at a start of the loop, and storing an identification of a different instruction that is programmed between the initial instruction and the particular instruction; and according to the stored identification, in response to detecting processing of the different instruction during an additional pass through the loop, initiating an additional fetch of the initial instruction.

12. The system of claim 11, wherein the circuitry is for:
in response to detecting processing of the particular instruction during the pass through the loop, initiating the fetch before processing a final instruction during the additional pass, wherein the final instruction is programmed at an end of the loop.

13. The system of claim 11, wherein the circuitry is for:
in response to detecting processing of the different instruction during the additional pass through the loop, initiating the additional fetch before processing a final instruction during the additional pass, wherein the final instruction is programmed at an end of the loop.

14. The system of claim 11, wherein the particular instruction is an instruction that includes an end-of-loop alert associated with the loop.

15. The system of claim 11, wherein the particular instruction is an instruction at which an end-of-loop mark is located in association with the loop.

16. The system of claim 11, wherein the loop is a first loop, and wherein the system processes multiple loops of instructions including the first loop and a second loop, and wherein the circuitry is for:
in response to detecting processing of the particular instruction during the pass through the loop, initiating the fetch if the first loop is an innermost nested loop that contains the particular instruction and is scheduled to be repeated in the additional pass before processing an instruction outside the first loop.

17. The system of claim 16, wherein the circuitry is for:
in response to detecting processing of the different instruction during the additional pass through the loop, initiating the additional fetch if the first loop is an innermost nested loop that contains the different instruction and is scheduled to be repeated in yet another pass before processing an instruction outside the first loop.

18. The system of claim 17, wherein the particular instruction is a first particular instruction, the initial instruction is a first initial instruction, the different instruction is a first different instruction, and the stored identification is a first stored identification, and wherein the circuitry is for:
in response to detecting processing of a second particular instruction during a pass through the second loop, initiating a fetch of a second initial instruction that is programmed at a start of the second loop, and storing a second identification of a second different instruction that is programmed between the second initial instruction and the second particular instruction; and
according to the second stored identification, in response to detecting processing of the second different instruction during an additional pass through the second loop, initiating an additional fetch of the second initial instruction.

19. The system of claim 18, wherein the circuitry is for:
in response to detecting processing of the second particular instruction during the pass through the second loop, initiating the fetch of the second initial instruction if the second loop is an innermost nested loop that contains the second particular instruction and is scheduled to be repeated in the additional pass before processing an instruction outside the second loop.

20. The system of claim 19, wherein the circuitry is for:
in response to detecting processing of the second different instruction during the additional pass through the second loop, initiating the additional fetch of the second initial instruction if the second loop is an innermost nested loop that contains the second different instruction and is scheduled to be repeated in yet another pass before processing an instruction outside the second loop.

* * * * *